April 15, 1969  RAOUL-HENRI ERARD  3,438,109
METHOD OF MAKING A BEARING

Filed Oct. 18, 1966  Sheet 1 of 2

INVENTOR
RAOUL-HENRI ERARD

BY Kenwood Vfan.
ATTORNEYS

UNITED STATES PATENT OFFICE

3,438,109
METHOD OF MAKING A BEARING
Raoul-Henri Erard, 82 Blvd. des Endroits, La Chaux-de-Fonds, Neuchatel, Switzerland
Filed Oct. 18, 1966, Ser. No. 587,440
Claims priority, application Switzerland, Oct. 18, 1965, 14,349/65
Int. Cl. B21d 53/10
U.S. Cl. 29—149.5        1 Claim

ABSTRACT OF THE DISCLOSURE

A method of manufacturing a bearing for a time piece comprising a bearing element rigid with a bearing body and an axial thrust member mounted in a recess within the bearing body comprising the steps, profiling an element on the periphery thereof with a recess and a projection corresponding to the general shape of the bearing body, working the profiled element by removing matter with a tool rotating concentrically to the axes of the profiled element with the projection serving to position and to resiliently hold the axial thrust member in situ.

Summary

Figure 1:
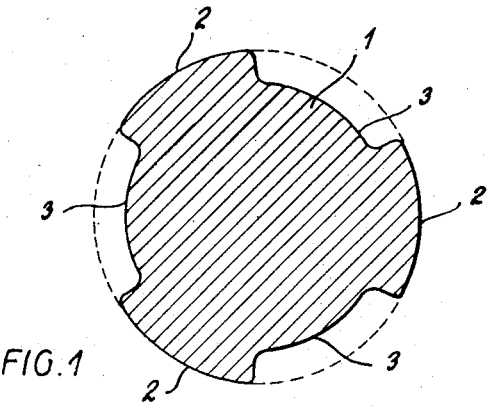

The present invention has for its object the teaching of a method of making a bearing device for the shaft of a rotatable member of a clockwork, comprising a bearing element rigid with a bearing body and an axial thrust member removably mounted in a recess of the bearing body.

Bearing devices are known in which the axial thrust member is removable from the bearing body, being maintained therein by means of a yielding of the wall of the recess containing the bearing body, with at least one aperture being provided for the introduction of a tool under the axial thrust member in order to separate it from the bearing body as shown, for example in Swiss Patent No. 339,136 and Swiss Patent No. 343,930.

Bearing devices normally require, in the manufacturing of the bearing body, the combination of screw-cutting and milling operations, which, irrespective of the delays caused by the machining operations, increase the manufacturing cost, produce troublesome burrs, particularly for small-sized bearing devices, thereby the accuracy and quality of the assembling procedure.

This invention envisions a bearing device consisting of a bearing element rigid with a bearing body and an axial thrust member removably mounted in a recess of the bearing body, the assembly being characterized by the fact that the bearing body periphery is provided with, at least, one recessed part and one projecting part, disposed in such a way that the projecting part yieldably maintains the axial thrust member.

The drawing shows the various steps in a manufacturing process of a first embodiment of the invention, as well as of a second embodiment.

Figure 3:
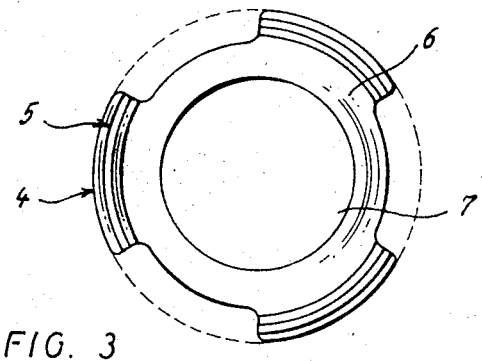
Figure 4:
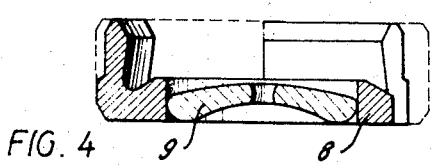
Figure 5:
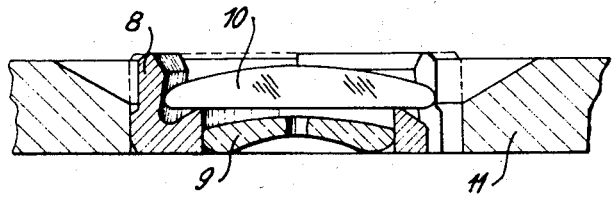
Figure 6:
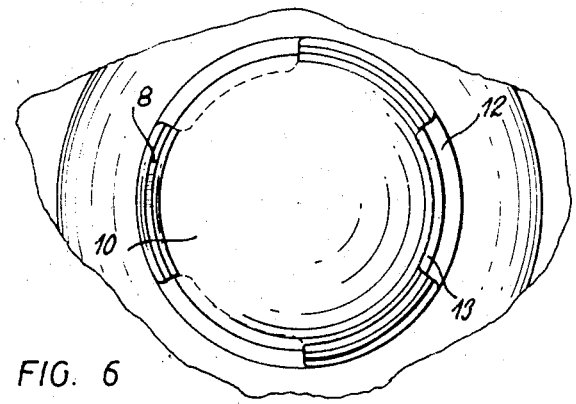
Figure 7:
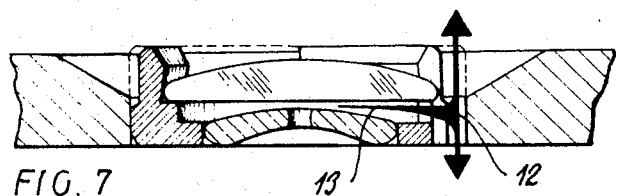
Figure 8:
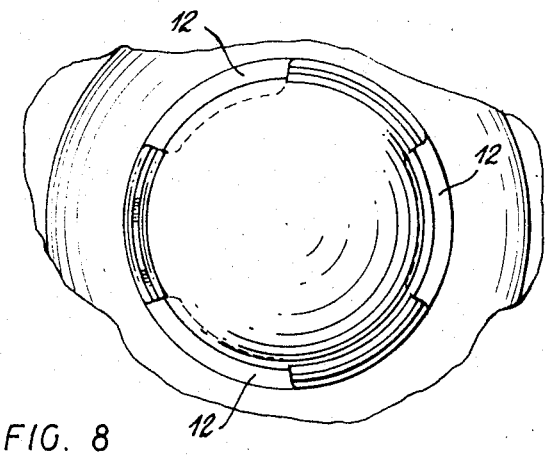

FIGURES 1, 2, 3 and 4 shows the various steps of the manufacturing process of the first embodiment, which embodiment is respectively represented in sectional and plan views by FIG. 5 and 6. FIGURES 7 and 8 are respectively sectional and plan views of the second embodiment.

For carrying out the maufacturing process of the first embodiment, one may start from a shaped metal rod, according to FIG. 1, having a cross section 1, the periphery of the rod being inscribed in a circumference and defining three equispaced projections 2, and three equispaced recesses 3. This shaped rod is obtained by drawing out in a die having a suitable profile.

The structure of the metal will be very homogeneous due to this drawing cut; on the other hand, the material will be cold-drawn on its periphery so as to be harder thereat.

The rod thus prepared is then machined in a screw machine, using a chuck closely fitting the rod periphery.

Figure 2:
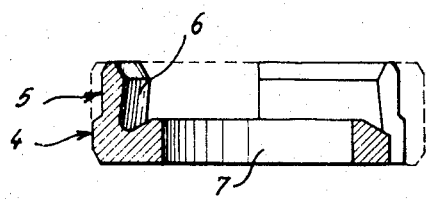

FIGURES 2 and 3 show the workpiece obtained from the screw machine, with the machining having accomplished to the truing at 4 and the recessing at 5 on the rod projections and the recessing of recesses 6 for receiving the axial thrust member, and the truing of a central opening 7 for receiving the bearing element. The diameter of the inner wall defining recess 6 for receiving the fixed thrust member is greater than that of the inscribed circumference which defines the recesses of the rod periphery, wherefore recess 6 is provided with three grips capable of yielding elastically to allow the setting and removing of the fixed thrust member.

The machining of the rod allows, by successive truings of the different surfaces, a workpiece which may be machined almost without any burrs and which requires no successive nor supplementary machining operations. This manufacturing process is therefore the quickest.

FIG. 4 shows the bearing body 8 obtained from the screw machine and into which a bearing element 9 has been forced. It is obvious that a modification of the bearing body also allows the forming of the bearing element integral with and hence of the same material as the bearing body 8.

FIGURES 5 and 6 show bearing body 8, and bearing element 9 with the fixed thrust member 10, all set in the bridge 11. A suitable tool with three grips, shaped according to the recesses 12 of the bearing body, allows the fixed thrust member to be gripped at its periphery, in order to pull it out of the bearing body.

The same tool may also be used to reset the fixed thrust member in its recess 6.

The embodiment described with three projecting parts is the most logical: it is however possible to conceive a bearing body having one, two, four or more recesses and projection. An embodiment with only one projection and only one recess will obviously require that the projection circumscribe the fixed thrust member on about ⅔ of its periphery, so as to locate it properly, the recess being then only formed in order to give more elasticity to the projection surrounding the fixed thrust member and to allow the setting and removing of the fixed thrust member.

For mass production, it is also possible to proceed in a different way, as follows: the bearing body is cut out of a strip material, according to a profile exactly fitting its definitive periphery; the cut blank is then fed as a strip in such a way that the blank comes to locate itself on the various machining stations which make the projections and recesses with a final station ejecting the finished workpiece. It is to be noticed that this manufacturing process, while requiring specific equipment, offers the advantage of a very simple manufacturing process which ensures the production of a workpiece without any burrs.

The bearing bodies made according to the manufacturing processes mentioned hereabove are generally made of metal; however, it is also possible to use shaped rods made of plastic material, for instance of "Delrin," which has a sufficient hardness and yet allows an accurate machining. Likewise, the use of a plastic material is permitted, such as Polyphenylen Oxide, having rather outstanding characteristics so far as mechanical strength, stability and machining possibilities are concerned.

In the same way, the specific characteristics of the bearing device, and especially the shape of the tightening grips and their elasticity, allow manufacturing of the bearing body from self-lubricating materials such as Teflon agglomerates and bronze or cupric oxides, same having specially interesting characteristics as far as the sliding coefficient is concerned and therefore allowing machining of the bearing element and bearing body of one piece.

The second embodiment, described and respectively represented in sectional and plan views in FIGS. 7 and 8, differs from the first embodiment only in the fact that the recess which constitutes the support of the axial thrust is recessed in such a way as the oiler 13, located between the bearing element and the axial thrust member, communicates with the outside of the bearing device through the cavities of the recessed parts of the bearing body, so that it is possible, when the clockwork is cleaned with a liquid solution, to obtain a correct circulation of the liquid and a proper draining thereof after cleaning. Practically, this clearance is obtained by the fact that the recess machined to receive the axial thrust comprises an inner recess which is of a diameter slightly greater than the diameter of the recessed parts of the outer profile, so that the recess opens in the cavities of the recessed parts.

What I claim is:

1. In a method of producing a watch movement bearing for insertion into a supporting bridge member with an internal cylindrical wall portion comprising a movable annular recessed bearing body centered in the bridge member and a bearing element frictionally engaged by the bearing body and an axial thrust member removably mounted in the recess of the bearing body with the periphery of the bearing body with the bearing body being characterized by a recessed portion and by three equispaced recesses and by three projecting parts equidistant from and concentric to the axis of the bearing body facilitating the setting and elastically maintaining and removing of the axial thrust member from the bearing body: the process consisting in, drawing a rod with a circumference defining three equispaced upstanding projections and three alternately spaced recesses, machining a central bearing body opening in the rod for receiving said bearing element, truing a bridge-bearing portion of the outer periphery of the bearing body and recessing the outer peripheral walls of the upstanding projections and recessing the inner-axial-thrust-member-receiving-walls of the projections and truing a central-bearing-element-receiving opening through the bearing body, with the diameter of the axial-thrust-member-receiving recess of the bearing body being greater than the inscribed circumference defining the recesses of the bearing body periphery for allowing access to three yieldable tool gripping surfaces on the fixed thrust member upon fixed thrust member setting and removal.

References Cited

UNITED STATES PATENTS

| 2,459,598 | 1/1949 | Stott | 58—152 |
| 2,689,380 | 9/1954 | Tait | 58—152 |

FOREIGN PATENTS

| 1,195,748 | 5/1959 | France. |
| 735,376 | 8/1955 | Great Britain. |
| 293,487 | 12/1953 | Switzerland. |
| 311,292 | 1/1956 | Switzerland. |
| 339,136 | 7/1959 | Switzerland. |
| 343,930 | 2/1960 | Switzerland. |

RICHARD B. WILKINSON, *Primary Examiner.*

STANLEY A. WAL, *Assistant Examiner.*

U.S. Cl. X.R.

29—177; 58—140